(12) United States Patent
Jiang

(10) Patent No.: US 10,797,117 B2
(45) Date of Patent: Oct. 6, 2020

(54) ORGANIC LIGHT EMITTING DIODE DISPLAY MODULE AND CONTROL METHOD THEREOF

(71) Applicant: BEIJING XIAOMI MOBILE SOFTWARE CO., LTD., Beijing (CN)

(72) Inventor: Zhongsheng Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/965,201

(22) Filed: Apr. 27, 2018

(65) Prior Publication Data
US 2018/0315799 A1  Nov. 1, 2018

(30) Foreign Application Priority Data

Apr. 28, 2017  (CN) .......................... 2017 1 0297567

(51) Int. Cl.
*G06F 21/32* (2013.01)
*H01L 27/32* (2006.01)
*G06K 9/00* (2006.01)
*G09G 3/3208* (2016.01)

(52) U.S. Cl.
CPC ............ *H01L 27/323* (2013.01); *G06F 21/32* (2013.01); *G06K 9/0004* (2013.01); *G09G 3/3208* (2013.01)

(58) Field of Classification Search
CPC ............ G06K 9/0004; G06K 9/00087; G06K 9/00013; G06F 3/042; G06F 3/0412; G06F 21/32
See application file for complete search history.

(56) References Cited

U.S. PATENT DOCUMENTS

| 7,358,515 | B2 * | 4/2008 | Setlak ............... G06K 9/00013 250/208.1 |
| 9,570,002 | B2 * | 2/2017 | Sakariya ............. G06F 3/0412 |
| 2016/0078270 | A1 * | 3/2016 | Lee ...................... G06K 9/0008 382/125 |

(Continued)

FOREIGN PATENT DOCUMENTS

| CN | 104463107 A | 3/2015 |
| CN | 104992094 A | 10/2015 |

(Continued)

OTHER PUBLICATIONS

European Extended Search Report issued in corresponding EP Patent Application No. 18169901.8, dated Sep. 12, 2018, 6 pages.

(Continued)

*Primary Examiner* — William Lu
(74) *Attorney, Agent, or Firm* — Arch & Lake LLP

(57) ABSTRACT

Provided are an organic light emitting diode display module, a control method for the organic light emitting diode display module, a display device and electronic equipment. The organic light emitting diode display module includes: an organic light emitting diode display panel, configured to emit light rays to a finger during fingerprint recognition; and a fingerprint sensor, arranged on a side of the display panel away from a light emerging side, configured to receive the light rays reflected by the finger and determine a fingerprint pattern of the finger according to the light rays reflected by the finger.

17 Claims, 12 Drawing Sheets

(56) References Cited

U.S. PATENT DOCUMENTS

| | | | | |
|---|---|---|---|---|
| 2016/0110025 A1* | 4/2016 | Hossu | ............... | G06F 3/0412 |
| | | | | 382/124 |
| 2016/0239150 A1* | 8/2016 | Lee | ............... | G06K 9/00013 |
| 2016/0266695 A1* | 9/2016 | Bae | ............... | G06F 1/1643 |
| 2017/0220838 A1* | 8/2017 | He | ............... | G06K 9/0004 |
| 2017/0279948 A1* | 9/2017 | Hong | ............... | G06K 9/00013 |
| 2017/0287992 A1* | 10/2017 | Kwak | ............... | H04M 1/0264 |
| 2017/0300736 A1* | 10/2017 | Song | ............... | G06K 9/00033 |
| 2017/0364763 A1* | 12/2017 | Jin | ............... | G06K 9/0002 |
| 2018/0046281 A1* | 2/2018 | Pi | ............... | A61B 5/02416 |
| 2018/0069068 A1* | 3/2018 | Ka | ............... | H01L 27/3262 |
| 2018/0173343 A1 | 6/2018 | Pi | | |
| 2018/0307817 A1* | 10/2018 | Lin | ............... | G06K 9/00033 |

FOREIGN PATENT DOCUMENTS

| | | |
|---|---|---|
| CN | 105047689 A | 11/2015 |
| CN | 105095877 A | 11/2015 |
| CN | 106020416 A | 10/2016 |
| CN | 106233305 A | 12/2016 |
| CN | 106326855 A | 1/2017 |
| CN | 106445242 A | 2/2017 |
| CN | 205983304 U | 2/2017 |
| EP | 3223123 A1 | 9/2017 |
| WO | 2016205832 A1 | 12/2016 |
| WO | 2017129126 A1 | 8/2017 |

OTHER PUBLICATIONS

First Office Action of the Chinese Application No. 201710297567.3, dated May 5, 2019 and English translation, (15p).
Third Office Action of the Chinese Application No. 201710297567.3, dated Jul. 29, 2020 with English translation, (18p).

* cited by examiner

ORGANIC LIGHT EMITTING DIODE DISPLAY MODULE AND CONTROL METHOD THEREOF

CROSS-REFERENCE TO RELATED APPLICATION

This application is filed based upon and claims priority to Chinese Patent Application No. 201710297567.3, filed on Apr. 28, 2017, the entire contents of which are incorporated herein by reference.

TECHNICAL FIELD

The present disclosure generally relates to the technical field of display, and more particularly, to an organic light emitting diode display module, a control method for the organic light emitting diode display module, a display device and electronic equipment.

BACKGROUND

In an existing fingerprint recognition solution, a fingerprint recognition sensor is usually arranged on a physical key to achieve a purpose of compatibility of the key and fingerprint recognition.

For example, for a mobile phone, as shown in FIG. 1 and FIG. 2, since a sensor is required to be arranged on a physical key, a space below a cover plate is relatively large, which easily makes an overall structure of equipment unstable. Moreover, the physical key is required to occupy a front region of a terminal such as the mobile phone, which reduces a display region.

SUMMARY

According to a first aspect of embodiments of the present disclosure, an organic light emitting diode display module is provided, which may include:

an organic light emitting diode display panel, configured to emit light rays to a finger during fingerprint recognition; and a fingerprint sensor, arranged on a side of the display panel away from a light emerging side, configured to receive light rays reflected by the finger and determine a fingerprint pattern of the finger according to the light rays reflected by the finger.

According to a second aspect of the embodiments of the present disclosure, a control method for an organic light emitting diode display module is provided, the organic light emitting diode display module including an organic light emitting diode display panel and a fingerprint sensor arranged on a side of the display panel away from a light emerging side, the control method including:

controlling the organic light emitting diode display panel to emit light rays to a finger during fingerprint recognition; and controlling the fingerprint sensor to receive the light rays reflected by the finger, and determining a fingerprint pattern of the finger according to the light rays reflected by the finger.

According to a third aspect of the embodiments of the present disclosure, a display device is provided, which may include the display module of any abovementioned embodiment.

According to a fourth aspect of the embodiments of the present disclosure, electronic equipment is provided, which may include:

a processor, and a memory configured to store an instruction executable by the processor, and may further include: an organic light emitting diode display module, the display module including:

an organic light emitting diode display panel, configured to emit light rays to a finger during fingerprint recognition; and a fingerprint sensor, arranged on a side of the display panel away from a light emerging side, configured to receive light rays reflected by the finger and determine a fingerprint pattern of the finger according to the light rays reflected by the finger.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms adopted in the present disclosure are intended not to limit the present disclosure but only to describe specific embodiments. "a," "said," and "the" adopted in the present disclosure and the appended claims and indicating a singular form are also intended to include a plural form unless their meanings are clearly expressed in the context. It should also be understood that term "and/or" adopted in the present disclosure refers to inclusion of any or all possible combinations of one or more associated items which are listed.

It should be understood that terms first, second, third and the like may be adopted to describe various kinds of information in the present disclosure but these information may not be limited to these terms. These terms are only adopted to distinguish the same type of information. For example, without departing from the scope of the present disclosure, first information may also be called second information, and similarly, second information may also be called first information. This depends on the context, and for example, term "if" adopted here may be explained as "at the time of" or "when" or "in response to determination."

Figure 3:
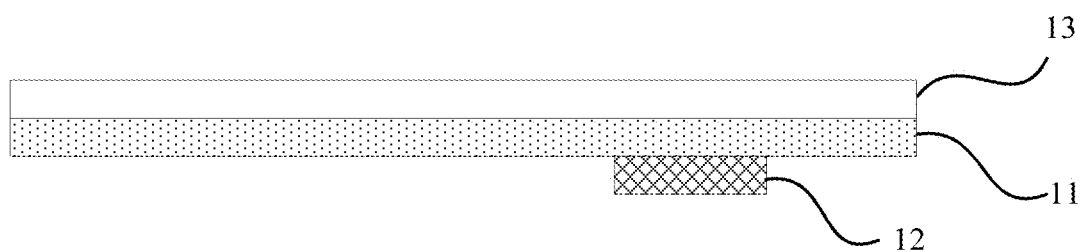
FIG. 3 is a structure diagram of an organic light emitting diode display module according to an aspect of the disclosure.

FIG. 3 is a structure diagram of an organic light emitting diode display module according to an aspect of the disclosure. The display module may be applied to display equipment such as a mobile phone, a tablet computer and a television. As shown in FIG. 3, the display module includes the following structures.

An organic light emitting diode display panel 11 is configured to emit light rays to a finger during fingerprint recognition, wherein a protective layer 13 may be arranged on the display panel 11.

In one or more embodiments, the organic light emitting diode display panel may be an Active-Matrix Organic Light Emitting Diode (AMOLED) display panel, and may also be an organic light emitting diode display panel of another type.

In one or more embodiments, the organic light emitting diode display panel adopts a top-emitting mode, and may also adopt a bottom-emitting mode. Pixel units of the display panel may externally emit light rays, and when the light rays irradiate a finger on the display panel, the fingerprint on the finger may reflect the light rays back to the display panel.

In one or more embodiments, there are no limits made to a specific manner about how to determine fingerprint recognition is required or not in the present disclosure. For example, a pressure sensor may be arranged in a preset region of the display panel, and when pressure higher than a preset pressure value is sensed, it is determined that fingerprint recognition is required. An instruction of a processor may also be adopted as a basis, for example, during fingerprint verification for payment, an instruction may be received from the processor and/or a control chip, thereby determining that fingerprint recognition is required.

As shown in FIGS. 3-6, a fingerprint sensor 12 is arranged on a side of the display panel 11 away from a light emerging side, and is configured to receive the light rays reflected by the finger and determine a fingerprint pattern of the finger according to the light rays reflected by the finger.

In one or more embodiments, since the organic light emitting diode display panel emits the light rays by exciting an organic luminous layer, no backlight module is required to be configured, a thickness of the display panel is relatively small, and a space may be reserved in the side away from the light emerging side to arrange the fingerprint sensor.

Figure 1:
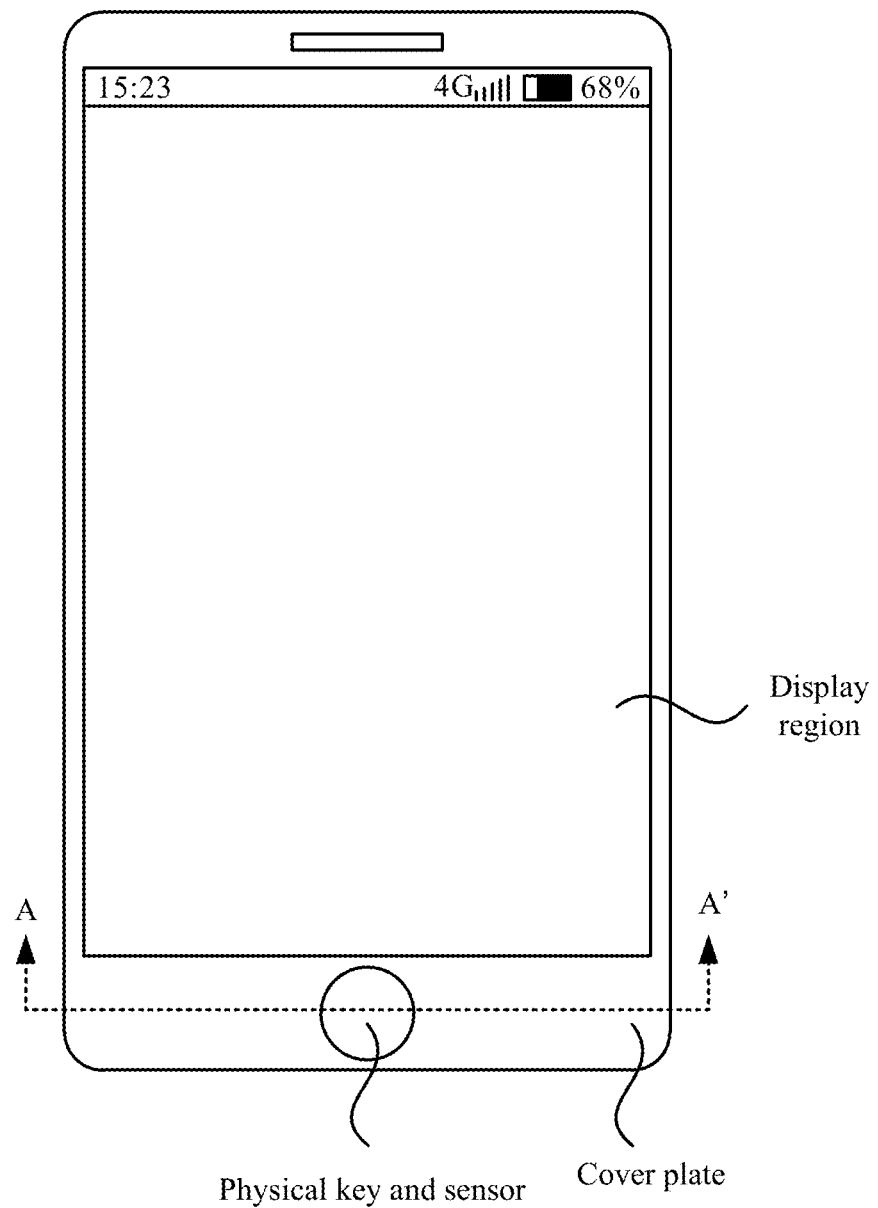
FIG. 1 is a structure diagram of a fingerprint recognition sensor according to the related technology.
Figure 2:
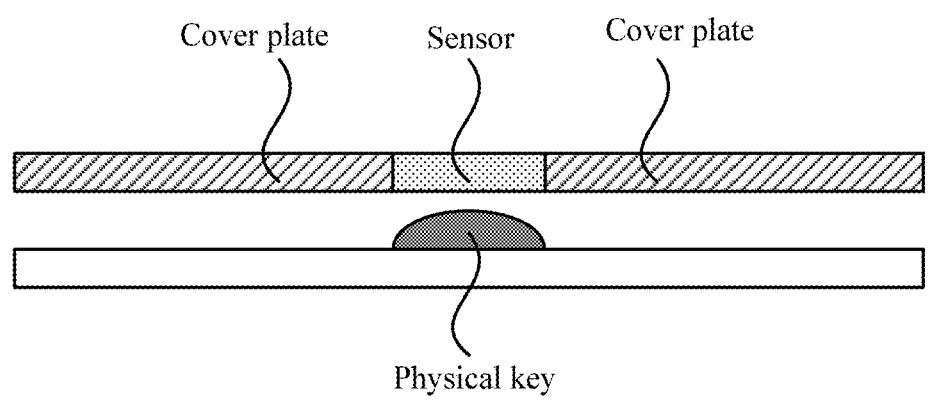
FIG. 2 is a schematic diagram illustrating a section along AA' in FIG. 1.

In one or more embodiments, the fingerprint sensor may be arranged in a region on a side of the display panel away from the light emerging side, as shown in FIG. 1, and may also be arranged in multiple regions on the side of the display panel away from the light emerging side. For example, the fingerprint sensor in each region may recognize different fingerprints, respectively. The fingerprint sensor may specifically be arranged according to a requirement.

Figure 4:
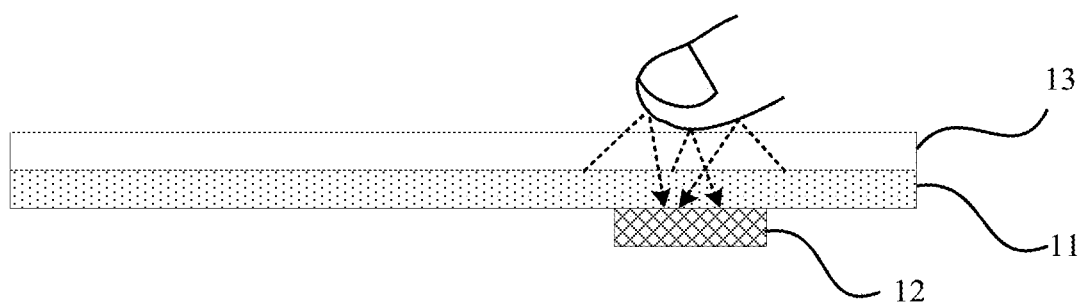
FIG. 4 is a structure diagram of a light path according to an aspect of the disclosure.

FIG. 4 is a structure diagram of a light path according to an aspect of the disclosure.

In one or more embodiments, as shown in FIG. 4, the light rays emitted by the display panel may irradiate the finger of a user through the protective layer. Valleys and ridges of the fingerprint are different in height, so that light reflected back to the display panel by the valleys and the ridges is also different, and light reflected to the fingerprint sensor is also different.

In one or more embodiments, the fingerprint sensor may include multiple photoelectric sensors arranged in a matrix, and the fingerprint pattern of the finger may be determined according to the light received by the multiple photoelectric sensors and reflected by the finger.

In one or more embodiments, the fingerprint sensor is arranged on a side of the display panel away from a light emerging direction, so that it is possible to reduce influence on stability of the display equipment where the display panel is located, and to facilitate decreasing of a proportion of a non-display region of the display equipment where the display panel is located and increasing of a proportion of a display region.

Optionally, the display panel includes a fingerprint recognition region, wherein pixels in the fingerprint recognition region may emit light rays having luminance higher than preset luminance to the fingerprint during fingerprint recognition. Here, the fingerprint recognition region may have pixels controlled by the fingerprint sensor or other controllers, where the pixels in the fingerprint recognition region is configured to emit light rays having different luminance levels depending on whether the fingerprint recognition function is activated. For example, when the fingerprint recognition function is activated, the pixels in the fingerprint recognition region emits light rays having luminance higher than preset luminance to the fingerprint during fingerprint recognition. When fingerprint recognition function is not activated, the pixels in the fingerprint recognition region emits light rays having same luminance as the other display regions, where the same luminance is lower than the preset luminance.

In one or more embodiments, since the organic light emitting diode display panel has relatively low visible light transmittance which is usually about 1% to 3%, most of the light reflected by the finger cannot reach the fingerprint sensor on the other side of the display panel after being emitted into the display panel. Therefore, the pixels in the fingerprint recognition region may be arranged to emit the light rays having luminance higher than the preset luminance, wherein the preset luminance may be set according to light emitting performance of the pixels, and for example, may be arranged to be maximum light emitting luminance of the pixels. Therefore, the light reflected by the finger may penetrate through the display panel to reach the fingerprint sensor as much as possible, and fingerprint recognition accuracy of the fingerprint sensor is further improved.

Optionally, the pixels in the fingerprint recognition region emits the light rays to the finger with the maximum luminance during fingerprint verification.

Optionally, the display panel includes the fingerprint recognition region, and the pixels in the fingerprint recognition region include:

infrared pixels and/or infrared subpixels, configured to emit infrared light rays to the finger during fingerprint recognition, wherein the fingerprint sensor is configured to receive the infrared light rays reflected by the finger.

In one or more embodiments, it can be seen according to the abovementioned embodiments that the organic light emitting diode display panel has the relatively low visible light transmittance, but the infrared light rays may still penetrate through the display panel with relatively high transmittance. Therefore, the infrared pixels are arranged in the fingerprint recognition region of the display panel, or the infrared subpixels are arranged in the pixel units, to emit the infrared rays to the finger during fingerprint recognition to enable the (infrared) light rays reflected by the finger to penetrate through the display panel to reach the fingerprint sensor as many as possible and further improve the fingerprint recognition accuracy of the fingerprint sensor.

Figure 5:
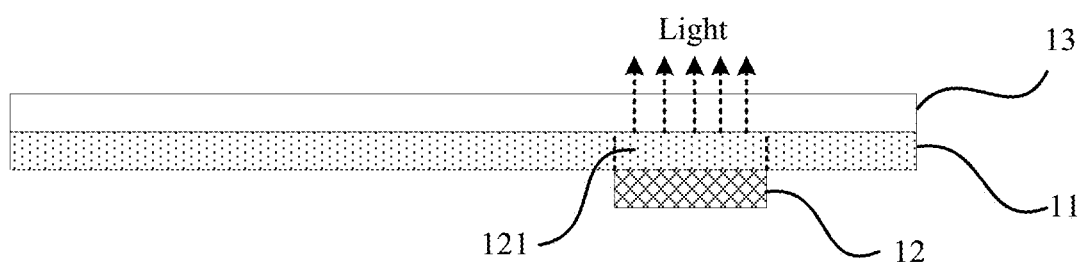
FIG. 5 is a schematic diagram illustrating a fingerprint recognition region according to an aspect of the disclosure.

FIG. 5 is a schematic diagram illustrating a fingerprint recognition region according to an aspect of the disclosure. As shown in FIG. 5, the fingerprint recognition region 121 corresponds to and has a same area as the region where the fingerprint sensor 12 is located.

In one or more embodiments, as shown in FIG. 5, a region corresponding to and having a same area as the region where the sensor is located may be set to be the fingerprint recognition region to control the pixels in the fingerprint recognition region to emit light rays with relatively high luminance or emit infrared light rays during fingerprint recognition, wherein the light rays emitted by the region may be emitted perpendicularly to the display panel, as shown in FIG. 5, and may also be emitted at another angle.

Figure 6:
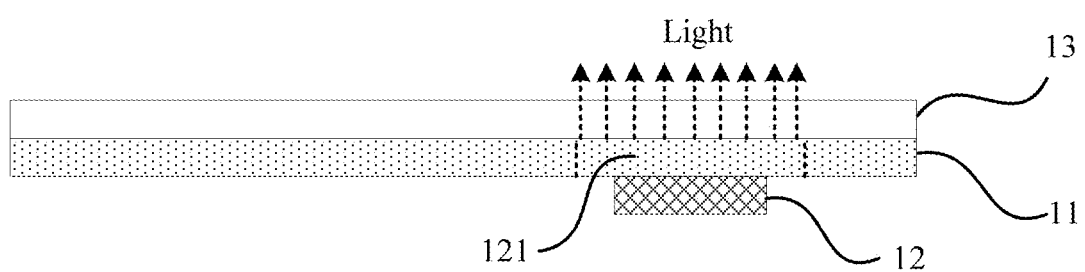
FIG. 6 is a schematic diagram illustrating another fingerprint recognition region according to an aspect of the disclosure.

FIG. 6 is a schematic diagram illustrating another fingerprint recognition region according to an aspect of the disclosure. As shown in FIG. 6, an area of the fingerprint recognition region 121 is larger than an area of the region where the fingerprint sensor 12 is located, and the region where the fingerprint sensor is located is located in the fingerprint recognition region 121.

In one or more embodiments, as shown in FIG. 6, a region corresponding to the region where the sensor is located and having an area larger than the region where the sensor is located may be set to be the fingerprint recognition region to control the pixels in the fingerprint recognition region to emit light rays with relatively high luminance or emit infrared light rays during fingerprint recognition.

The embodiments shown in FIG. 5 and FIG. 6 are compared. In the embodiment shown in FIG. 5, the fingerprint recognition region is relatively small, so that a number of pixels required to be controlled to emit light rays with relatively high luminance or emit infrared light rays is also relatively small during fingerprint recognition, and internal wiring of the display panel is favorably simplified. In the embodiment shown in FIG. 6, the fingerprint recognition region is relatively large, and since fingers of different users have different sizes and it may not be ensured that the fingerprint completely corresponds to the fingerprint sensor, in the embodiment shown in FIG. 6, the light rays may be emitted to the fingerprint through a region with a larger area to further ensure that the fingerprint sensor may receive the light rays reflected by the finger with a larger area to accurately determine the fingerprint pattern of the finger.

In some embodiments, the embodiments shown in FIG. 5 and FIG. 6 may be combined. For example, when the fingerprint sensor is located in the multiple regions on the side of the display panel away from the light emerging side, part of the regions may be arranged in a manner of the embodiment shown in FIG. 5, and the other part of regions may be arranged in a manner of the embodiment shown in FIG. 6.

Optionally, the display panel is electrically connected to the fingerprint sensor and configured to, when emitting the light rays to the finger, transmit a signal for triggering reception of the light rays reflected by the finger to the fingerprint sensor.

In one or more embodiments, the fingerprint sensor may be controlled to be started in a hardware manner. For example, a wire is arranged between the display panel and the fingerprint sensor, and when the display panel senses that fingerprint recognition is required (for example, a pressure sensor in the display panel senses a pressure higher than the preset pressure value), at the same time when the light rays are emitted to the fingerprint, the triggering signal, such as a high-level signal, is transmitted to the fingerprint sensor through the wire to trigger the fingerprint sensor to be started, so that the fingerprint sensor receives the light rays reflected by the finger.

Optionally, the display module further includes:

a control chip, electrically connected to the display panel and the fingerprint sensor respectively to transmit a control instruction for emitting the light rays to the finger to the display panel and transmit a control instruction for receiving the light rays reflected by the finger to the fingerprint sensor during fingerprint recognition.

In one or more embodiments, the fingerprint sensor may be controlled to be started in a software manner. For example, when the control chip determines that fingerprint recognition is required (for example, during fingerprint verification for payment), the control instructions may be transmitted to the display panel and the fingerprint sensor respectively to control the display panel to emit the light rays to the finger on one hand and control the fingerprint sensor to be started so as to receive the light rays reflected by the finger on the other hand.

The present disclosure further discloses a display device, which includes the display module of any abovementioned embodiment.

Figure 7:
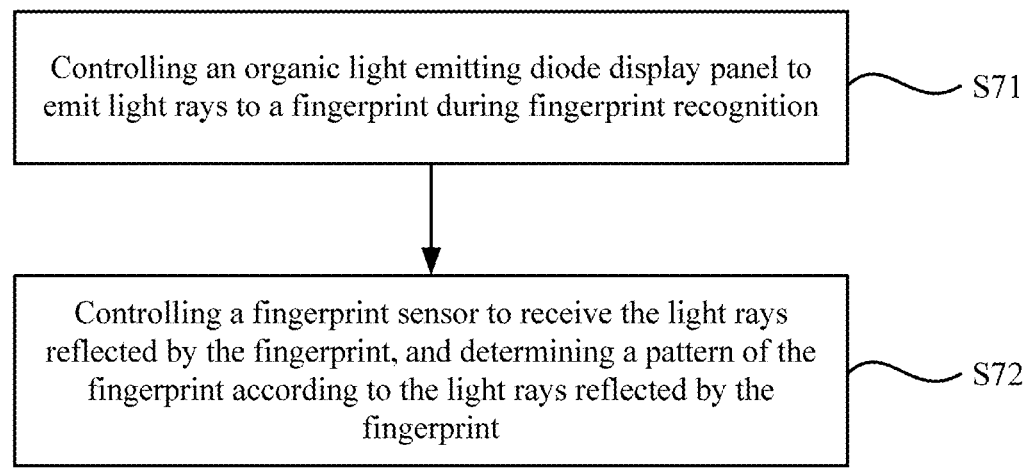
FIG. 7 is a schematic flow chart showing a control method for an organic light emitting diode display module according to an aspect of the disclosure.

FIG. 7 is a schematic flow chart showing a control method for an organic light emitting diode display module according to an aspect of the disclosure. The organic light emitting diode display module includes an organic light emitting diode display panel and a fingerprint sensor arranged on a side of the display panel away from a light emerging side. As shown in FIG. 7, the control method includes:

Step S71: controlling the organic light emitting diode display panel to emit light rays to a finger during fingerprint recognition; and Step S72: controlling the fingerprint sensor to receive the light rays reflected by the finger, and determining a fingerprint pattern of the finger according to the light rays reflected by the finger.

Figure 8:
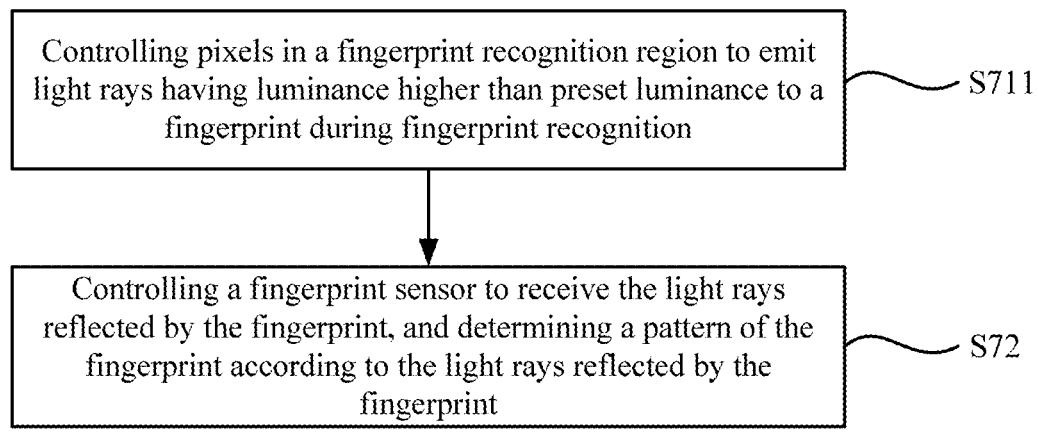
FIG. 8 is a schematic flow chart showing another control method for an organic light emitting diode display module according to an aspect of the disclosure.

FIG. 8 is a schematic flow chart showing a control method for an organic light emitting diode display module according to an aspect of the disclosure. The display panel includes a fingerprint recognition region. As shown in FIG. 8, on the basis of the embodiment shown in FIG. 7, controlling the organic light emitting diode display panel to emit the light rays to the finger includes:

Step S711: controlling pixels in the fingerprint recognition region to emit light rays having luminance higher than preset luminance to the fingerprint.

Figure 9:
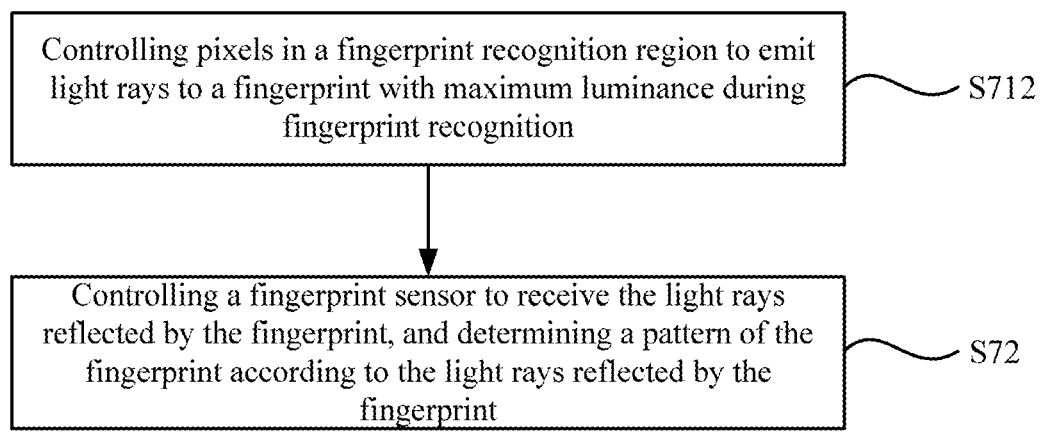
FIG. 9 is a schematic flow chart showing another control method for an organic light emitting diode display module according to an aspect of the disclosure.

FIG. 9 is a schematic flow chart showing a control method for an organic light emitting diode display module according to an aspect of the disclosure. As shown in FIG. 9, on the basis of the embodiment shown in FIG. 8, controlling the pixels in the fingerprint recognition region to emit the light rays having luminance higher than the preset luminance to the fingerprint includes:

Step S712: controlling the pixels in the fingerprint recognition region to emit the light rays to the finger with maximum luminance.

Figure 10:
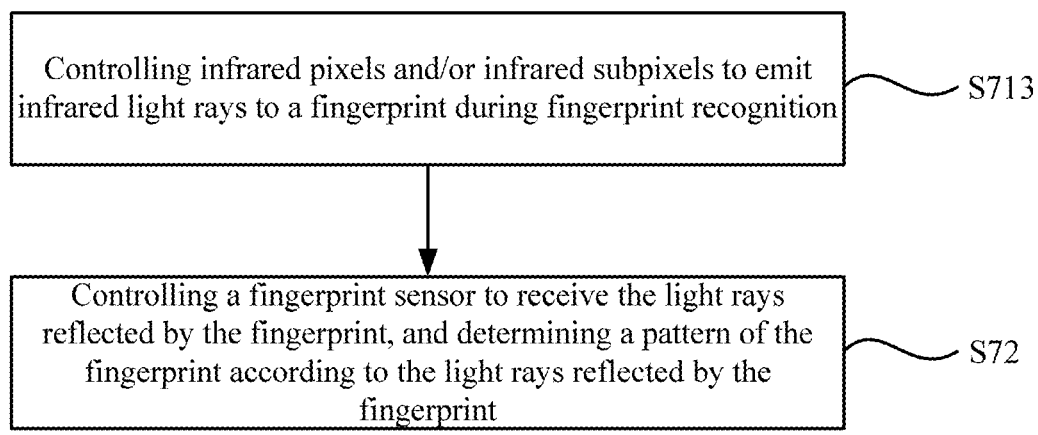
FIG. 10 is a schematic flow chart showing another control method for an organic light emitting diode display module according to an aspect of the disclosure.

FIG. 10 is a schematic flow chart showing a control method for an organic light emitting diode display module according to an aspect of the disclosure. The display panel includes the fingerprint recognition region, and the pixels in the fingerprint recognition region include infrared pixels and/or infrared subpixels. As shown in FIG. 10, on the basis of the embodiment shown in FIG. 7, controlling the organic light emitting diode display panel to emit the light rays to the finger includes:

Step S713: controlling the infrared pixels and/or the infrared subpixels to emit infrared light rays to the finger.

Figure 11:
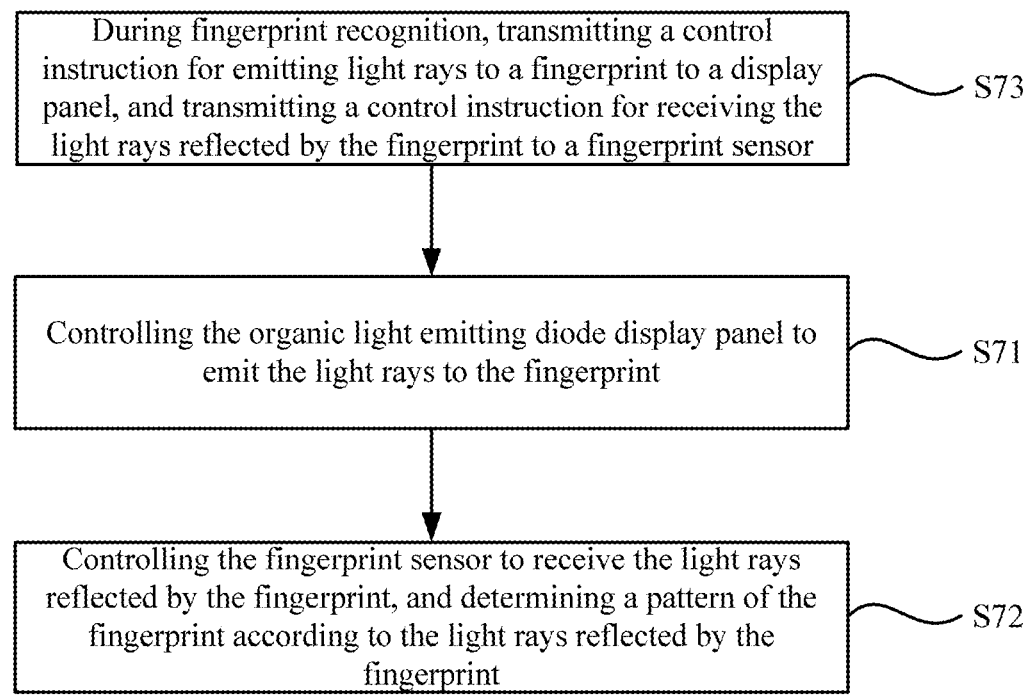
FIG. 11 is a schematic flow chart showing another control method for an organic light emitting diode display module according to an aspect of the disclosure.

FIG. 11 is a schematic flow chart showing a control method for an organic light emitting diode display module according to an aspect of the disclosure. As shown in FIG. 11, on the basis of the embodiment shown in FIG. 7, before controlling the organic light emitting diode display panel to emit the light rays to the finger, the method further includes:

Step S73: during fingerprint recognition, transmitting a control instruction for emitting the light rays to the finger to the display panel, and transmitting a control instruction for receiving the light rays reflected by the finger to the fingerprint sensor.

Figure 12:
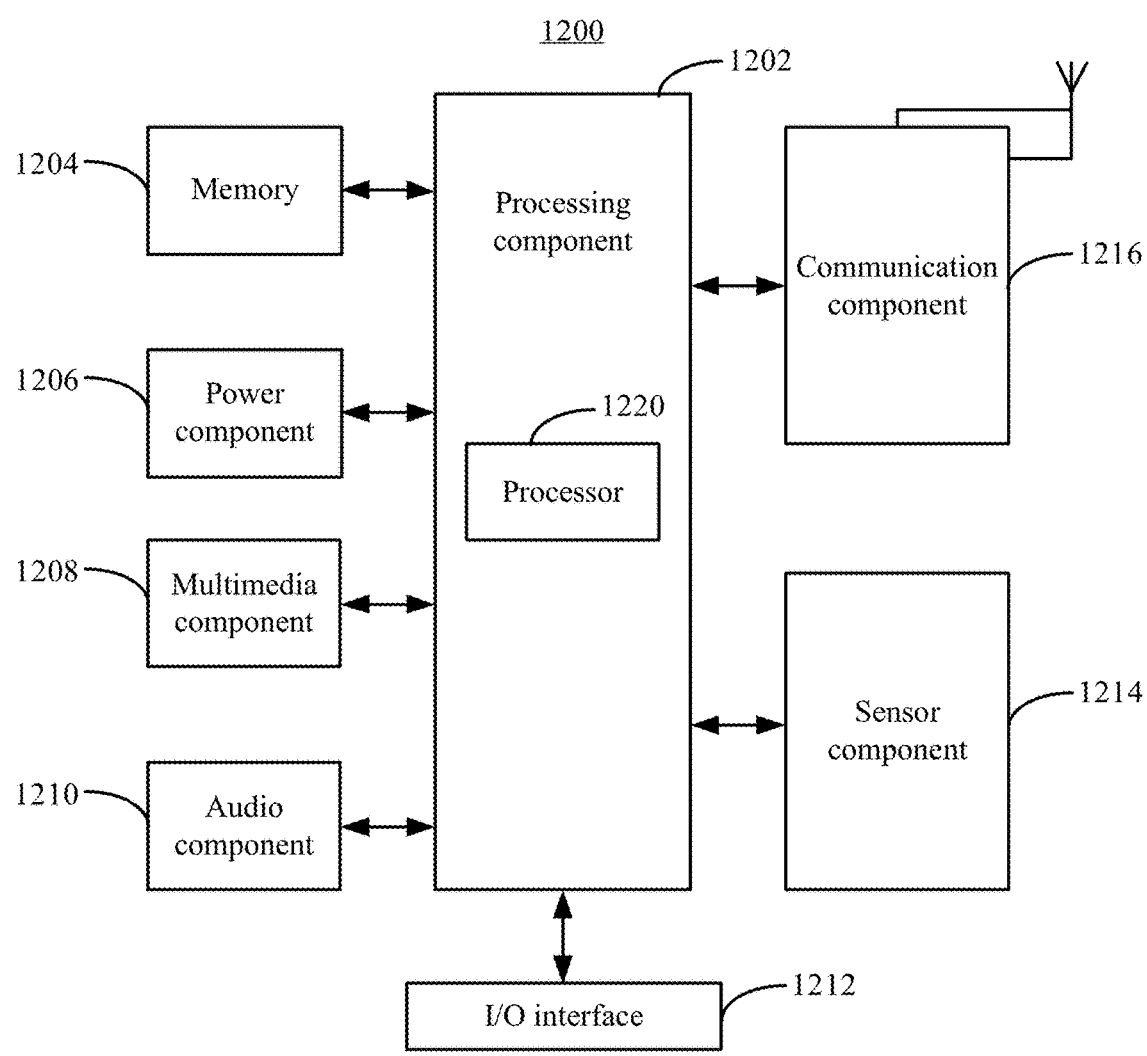
FIG. 12 is a block diagram of a display device according to an aspect of the disclosure.

FIG. 12 is a block diagram of a display device 1200 according to an aspect of the disclosure. For example, the device 1200 may be a mobile phone, a computer, a digital broadcast terminal, a messaging device, a gaming console, a tablet, a medical device, exercise equipment, a personal digital assistant and the like.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216, and further includes: an organic light emitting diode display module, the display module including: an organic light emitting diode display panel, configured to emit light rays to a finger during fingerprint recognition; and a fingerprint sensor, arranged on a side of the display panel away from a light emerging side, configured to receive the light rays reflected by the finger and determine a fingerprint pattern of the finger according to the light rays reflected by the finger.

The processing component 1202 typically controls overall operations of the device 1200, such as the operations associated with display, telephone calls, data communications, camera operations, and recording operations. The processing component 1202 may include one or more processors 1220 to execute instructions. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

The memory 1204 is configured to store various types of data to support the operation of the device 1200. Examples of such data include instructions for any application programs operated on the device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 provides power for various components of the device 1200. The power component 1206 may include a power management system, one or more power supplies, and other components associated with the generation, management and distribution of power for the device 1200.

The multimedia component 1208 includes a screen providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may be further stored in the memory 1204 or sent through the communication component 1216. In some embodiments, the audio component 1210 further includes a speaker configured to output the audio signal.

The I/O interface 1212 provides an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 includes one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and other equipment. The device 1200 may access a communication-standard-based wireless network, such as a Wireless Fidelity (WiFi) network, a 2nd-Generation (2G) or 3rd-Generation (3G) network or a combination thereof. In an aspect of the disclosure, the communication component 1216 receives a broadcast signal or broadcast associated information from an external broadcast management system through a broadcast channel. In an aspect of the disclosure, the communication component 1216 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an aspect of the disclosure, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components.

In an aspect of the disclosure, there is also provided a non-transitory computer-readable storage medium including an instruction, such as the memory 1204 including an instruction, and the instruction may be executed by the processor 1220 of the device 1200 to implement the above-mentioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An organic light emitting diode display module, the display module comprising:
    an organic light emitting diode display panel, wherein the organic light emitting diode display panel is configured to emit light rays towards a finger placed adjacent to the organic light emitting diode display panel during a fingerprint recognition operation; and
    a fingerprint recognition region defined within the organic light emitting diode display panel, wherein the fingerprint recognition region includes infrared pixels and/or infrared subpixels,
    a fingerprint sensor positioned within the fingerprint recognition region and arranged on a side of the organic light emitting diode display panel away from a light emerging side,
        wherein the fingerprint sensor is configured to receive light rays reflected by the finger,
        wherein the fingerprint sensor generates a fingerprint pattern of the finger according to the light rays reflected by the finger, and
    wherein the infrared pixels and/or infrared subpixels are controlled to emit infrared light rays towards the finger during the fingerprint recognition operation, and the fingerprint sensor is configured to receive the infrared light rays that are reflected by the finger and are penetrating though the organic light emitting diode display panel, and to determine the fingerprint pattern of the finger using the reflected infrared light rays, and
    wherein the organic light emitting diode display panel is electrically connected to the fingerprint sensor through a wire arranged between the organic light emitting diode display panel and the fingerprint sensor and configured to, when emitting the light rays to the finger in response to that a pressure sensor in the organic light emitting diode display panel senses that the fingerprint recognition operation is required, transmit, through the wire, a signal for triggering reception of the light rays reflected by the finger to the fingerprint sensor.

2. The display module of claim 1, wherein the pixels in the fingerprint recognition region emit light rays having luminance higher than preset luminance to the fingerprint during fingerprint recognition.

3. The display module of claim 2, wherein the pixels in the fingerprint recognition region emit the light rays to the finger with maximum luminance during fingerprint verification.

4. The display module of claim 2, wherein the fingerprint recognition region corresponds to and has a same area as a region where the fingerprint sensor is located.

5. The display module of claim 1, wherein the fingerprint recognition region corresponds to and has a same area as a region where the fingerprint sensor is located.

6. The display module of claim 2, wherein an area of the fingerprint recognition region is larger than an area of a region where the fingerprint sensor is located, and the region where the fingerprint sensor is located is located in the fingerprint recognition region.

7. The display module of claim 1, wherein an area of the fingerprint recognition region is larger than an area of a region where the fingerprint sensor is located, and the region where the fingerprint sensor is located is located in the fingerprint recognition region.

8. The display module of claim 1, wherein the pressure sensor in the organic light emitting diode display panel senses that the fingerprint recognition operation is required comprises: the pressure sensor in the organic light emitting diode display panel senses a pressure higher than a preset pressure value.

9. The display module of claim 1, further comprising:
    a control chip, electrically connected respectively to the display panel and
    the fingerprint sensor, wherein the control chip is configured to,
    during the fingerprint recognition operation, transmit a control instruction for emitting the light rays to the finger to the display panel; and transmit a control instruction for receiving the light rays reflected by the finger to the fingerprint sensor during the fingerprint recognition operation.

10. A control method for an organic light emitting diode display module, the organic light emitting diode display module comprising an organic light emitting diode display panel and a fingerprint sensor arranged on a side of the display panel away from a light emerging side, the control method comprising:

transmitting a control instruction for emitting light rays to a finger to the organic light emitting diode display panel in response to that a pressure sensor in the organic light emitting diode display panel senses that a fingerprint recognition operation is required, and transmitting, through a wire arranged between the organic light emitting diode display panel and the fingerprint sensor, a control instruction for triggering reception of the light rays reflected by the finger to the fingerprint sensor;

controlling the organic light emitting diode display panel to emit the light rays towards the finger during the fingerprint recognition operation, wherein the organic light emitting diode display panel comprises a fingerprint recognition region, the fingerprint sensor is positioned within the fingerprint recognition region, and pixels in the fingerprint recognition region comprise infrared pixels and/or infrared subpixels configured to emit infrared light rays towards the finger; and controlling the fingerprint sensor to receive the light rays reflected by the finger, and determining a fingerprint pattern of the finger according to the light rays reflected by the finger; and wherein controlling the fingerprint sensor to receive the light rays reflected by the finger comprises: controlling the fingerprint sensor to receive the infrared light rays that are reflected by the finger and are penetrating though the display panel, and wherein determining the fingerprint pattern of the finger according to the light rays reflected by the finger comprises: determining the fingerprint pattern of the finger using the reflected infrared light rays.

11. The control method of claim 10, wherein controlling the organic light emitting diode display panel to emit the light rays to the finger further comprises: controlling the pixels in the fingerprint recognition region to emit light rays having luminance higher than preset luminance to the fingerprint.

12. The control method of claim 11, wherein controlling the pixels in the fingerprint recognition region to emit the light rays having luminance higher than the preset luminance to the fingerprint comprises: controlling the pixels in the fingerprint recognition region to emit the light rays to the finger with maximum luminance.

13. The control method of claim 10, wherein the pressure sensor in the organic light emitting diode display panel senses that the fingerprint recognition operation is required comprises: the pressure sensor in the organic light emitting diode display panel senses a pressure higher than a preset pressure value.

14. Electronic equipment, comprising:
a processor, and
a memory configured to store an instruction executable by the processor,
an organic light emitting diode display module, the display module comprising:
an organic light emitting diode display panel, wherein the organic light emitting diode display panel is configured to emit light rays towards a finger during a fingerprint recognition operation; and
a fingerprint recognition region defined within the organic light emitting diode display panel, wherein the fingerprint recognition region includes infrared pixels and/or infrared subpixels,
a fingerprint sensor positioned within the fingerprint recognition region and arranged on a side of the organic light emitting diode display panel away from a light emerging side,
wherein the fingerprint sensor is configured to receive light rays reflected by the finger,
wherein the fingerprint sensor generates a fingerprint pattern of the finger according to the light rays reflected by the finger, and
wherein the infrared pixels and/or infrared subpixels are controlled to emit infrared light rays towards the finger during the fingerprint recognition operation, and the fingerprint sensor is configured to receive the infrared light rays that are reflected by the finger and are penetrating though the organic light emitting diode display panel, and to determine the fingerprint pattern of the finger using the reflected infrared light rays, and
wherein the organic light emitting diode display panel is electrically connected to the fingerprint sensor through a wire arranged between the organic light emitting diode display panel and the fingerprint sensor and configured to, when emitting the light rays to the finger in response to that a pressure sensor in the organic light emitting diode display panel senses that the fingerprint recognition operation is required, transmit, through the wire, a signal for triggering reception of the light rays reflected by the finger to the fingerprint sensor.

15. The electronic equipment of claim 14, wherein the pixels in the fingerprint recognition region emit light rays having luminance higher than preset luminance to the fingerprint during fingerprint recognition.

16. The electronic equipment of claim 15, wherein the pixels in the fingerprint recognition region emit the light rays to the finger with maximum luminance during fingerprint verification.

17. The electronic equipment of claim 14, wherein the processor is configured to: instruct the pixels in the fingerprint recognition region to emit light rays having different luminance levels depending on whether a fingerprint recognition function is activated.

* * * * *